United States Patent
Wang et al.

(10) Patent No.: US 9,081,503 B2
(45) Date of Patent: Jul. 14, 2015

(54) METHODS AND SYSTEMS FOR MAINTAINING A STORAGE VOLUME WITH HOLES AND FILLING HOLES

(71) Applicant: Apple Inc., Cupertino, CA (US)

(72) Inventors: Wenguang Wang, Santa Clara, CA (US); David A. Majnemer, Great Neck, NY (US)

(73) Assignee: Apple Inc., Cupertino, CA (US)

( * ) Notice: Subject to any disclaimer, the term of this patent is extended or adjusted under 35 U.S.C. 154(b) by 183 days.

(21) Appl. No.: 13/653,371

(22) Filed: Oct. 16, 2012

(65) Prior Publication Data

US 2013/0219139 A1    Aug. 22, 2013

Related U.S. Application Data

(60) Provisional application No. 61/699,166, filed on Sep. 10, 2012, provisional application No. 61/599,930, filed on Feb. 16, 2012.

(51) Int. Cl.
*G06F 12/14* (2006.01)
*G06F 12/16* (2006.01)
*G06F 3/06* (2006.01)

(52) U.S. Cl.
CPC .............. *G06F 3/061* (2013.01); *G06F 3/064* (2013.01); *G06F 3/0644* (2013.01); *G06F 3/0647* (2013.01); *G06F 3/0685* (2013.01)

(58) Field of Classification Search
CPC ................................ G06F 12/14; G06F 12/16
USPC .................. 711/162, 163, E12.103, E12.091, 711/E12.025, 154; 709/250; 370/338
See application file for complete search history.

(56) References Cited

U.S. PATENT DOCUMENTS

| | | | |
|---|---|---|---|
| 5,983,329 A | 11/1999 | Thaler et al. | |
| 6,598,134 B2 * | 7/2003 | Ofek et al. | 711/162 |
| 6,954,828 B2 | 10/2005 | Devereux | |
| 8,200,722 B2 | 6/2012 | Grubbs et al. | |
| 2005/0102255 A1 * | 5/2005 | Bultman | 707/1 |
| 2005/0198447 A1 * | 9/2005 | Corrado | 711/152 |
| 2005/0240725 A1 * | 10/2005 | Robinson et al. | 711/114 |
| 2010/0153631 A1 * | 6/2010 | Moon et al. | 711/103 |
| 2011/0246832 A1 * | 10/2011 | Akiyama et al. | 714/37 |
| 2011/0289263 A1 * | 11/2011 | McWilliams et al. | 711/103 |

OTHER PUBLICATIONS

Zhang et al, "Automated lookahead data migration in SSD-enabled multi-tiered storage systems", May 3-7, 2010, IEEE, Mass Storage Systems and Technologies (MSST), 2010 IEEE 26th Symposium, pp. 1-6.*

* cited by examiner

*Primary Examiner* — Cheng-Yuan Tseng
*Assistant Examiner* — Kamal K Dewan
(74) *Attorney, Agent, or Firm* — Blakely, Sokoloff, Taylor & Zafman LLP (57) ABSTRACT

In one embodiment, a method for managing access to a fast non-volatile storage device, such as a solid state device, and a slower non-volatile storage device, such as a magnetic hard drive, can include a method of managing a sparse logical volume in which unmapped blocks of the logical volume are not allocated until use. In one embodiment, a method of sparse hole filling operates in which range locks are dynamically adjusted to perform allocations for sparse hole filling, and then re-adjusted to perform standard operations using a byte range lock. In one embodiment, a high level data structure can be used in the range lock service in the form of an ordered search tree, which could use any search tree algorithm, such as red-black tree, AVL tree, splay tree, etc.

23 Claims, 12 Drawing Sheets

Reblock_or_Wakeup(node) 1300

Fig. 13

TryGrowRange(node,new_offset,new_length) 1400

Grow Range (node, new_offset, new_length) 1500

*Fig. 16*

Wait for Shrink (offset, length) 1600

METHODS AND SYSTEMS FOR MAINTAINING A STORAGE VOLUME WITH HOLES AND FILLING HOLES

CROSS-REFERENCE

The present application is related to, and claims the benefit of provisional application Ser. No. 61/599,930 filed Feb. 16, 2012, and provisional application Ser. No. 61/699,166, filed Sep. 10, 2012, both of which are incorporated herein by reference. The present application is also related to application Ser. No. 61/599,927 filed on Feb. 16, 2012, which is incorporated herein by reference.

BACKGROUND OF THE INVENTION

The present invention relates to methods for managing storage of data in a composite non-volatile memory that is a composite of a slow memory device and a fast memory device. In a composite disk system, a large, slow, and inexpensive magnetic hard drive can be combined with a small, fast but expensive storage device, such as a solid state drive to form a logical volume. Techniques to manage data transfer between memory devices have to take into account the overhead that I/O operations on and between the devices can present, and manage that overhead in an efficient manner.

One element of I/O overhead in managing storage devices is the serializing of disk operations enforced by byte range locking algorithms, which preserve data integrity by requiring atomic operations on certain storage byte ranges. When one process has a lock on a range of addresses, other processes may not be able to access the locked address range. Accordingly, one process's byte-range locks can block a different process's I/O operation if the operations are to overlapping addresses, which can reduce system performance.

SUMMARY OF THE DESCRIPTION

In one embodiment, a method for managing access to a fast non-volatile storage device, such as a solid state device, and a slower non-volatile storage device, such as a magnetic hard drive, can include a method of managing a sparse logical volume in which unmapped blocks of the logical volume are not allocated until use. Maintaining the sparse logical volume can utilize a method of sparse hole filling in which range locks are dynamically adjusted to perform allocations for sparse hole filling, and then re-adjusted to perform standard operations.

In one embodiment, a high level data structure can be used in the range lock service in the form of an ordered search tree, which can use any search tree algorithm, such as red-black tree, AVL tree, splay tree, etc. In one embodiment, each node in the tree represents a range that has been locked, which contains the offset and length of the range, and has a conditional variable for other threads to wait on. Additionally each node can have two queues: a waiting queue and a wait-for-shrink queue.

Other features of the present invention will be apparent from the accompanying drawings and from the detailed description, which follows.

The above summary does not include an exhaustive list of all aspects of the present invention. It is contemplated that the invention includes all systems and methods that can be practiced from all suitable combinations of the various aspects summarized above, and also those disclosed in the Detailed Description below.

BRIEF DESCRIPTION OF THE DRAWINGS

The present invention is illustrated by way of example, and not limitation, in the figures of the accompanying drawings in which like references indicate similar elements, and in which.

DETAILED DESCRIPTION

Various embodiments and aspects of managing a composite, non-volatile data storage device will be described with reference to details discussed below. The accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present invention.

Reference in the specification to "one embodiment" or "an embodiment" means that a particular feature, structure, or characteristic described in conjunction with the embodiment can be included in at least one embodiment of the invention.

The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software (as instructions on a non-transitory machine-readable storage medium), or a combination of both. Although some of the processes are described below in terms of sequential operations, it should be appreciated that some of the operations described may be performed in a different order. Moreover, some operations may be performed in parallel rather than sequentially.

Figure 1:
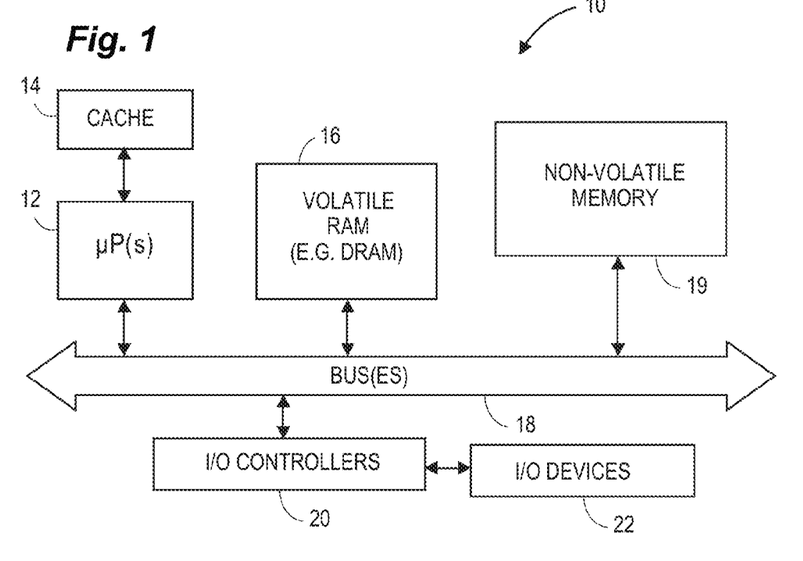
FIG. 1 shows an example of a data processing system which may be employed with an embodiment of the present invention.

FIG. 1 shows an example of a computing system 10, which is a form of a data processing system, which can be employed with one or more embodiments described herein. The system 10 can be a desktop computer system or a laptop computer system or a Smartphone, or some other electronic devices or consumer electronic devices. The system 10 can include one or more microprocessors or other logic units 12 coupled to an optional cache 14 which in one embodiment can be SRAM, as known in the art. The one or more microprocessors 12 are coupled to the rest of the system through one or more buses 18, which couple the one or more microprocessors 12 to main memory, which can be volatile RAM 16. In one embodiment, volatile RAM can be the conventional DRAM used in computer systems, where the DRAM is coupled through the bus to the rest of the components in the system 10. The system 10 can also include one or more input/output controllers 20, which couple one or more input/output devices 22 to the rest of the system through the one or more buses 18. The system 10 also includes a non-volatile memory 19 which can be a composite disk, such as a combination of flash memory, which is a form of a solid state, drive and a conventional magnetic hard drive.

Figure 2:
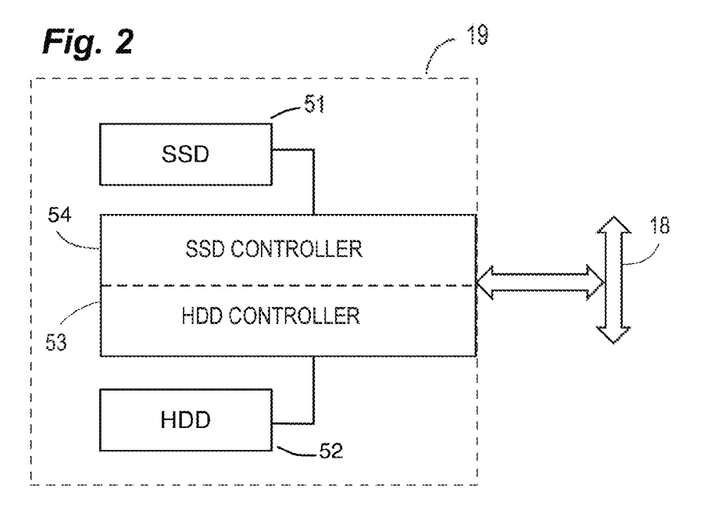
FIG. 2 shows an example of a composite non-volatile memory according to one embodiment of the present invention.

FIG. 2 shows an example of a composite disk according to one embodiment. The non-volatile memory 19 includes a solid state drive 51 and a magnetic hard drive 52 which can be treated as a single logical volume, or block device by a file system and an operating system and are controlled by one or more controllers, such as controller 54 which includes a solid state drive controller, and controller 53 which includes a hard disk drive controller. The one or more controllers couple the composite drive shown in FIG. 2 to the rest of the components in system 10 through the bus 18. It will be appreciated that flash memory is one form of a fast non-volatile storage device and that other fast storage devices can alternatively be used in conjunction with a slower storage device, which can be a conventional magnetic hard drive or other non-volatile storage devices which have a higher storage volume than, but are slower than the faster storage device. It will be understood that in this description a reference to SSD or HDD will be construed to mean the faster and the slower non-volatile storage devices and will not be construed as being limited to, or specific to any storage device technology.

Figure 3:
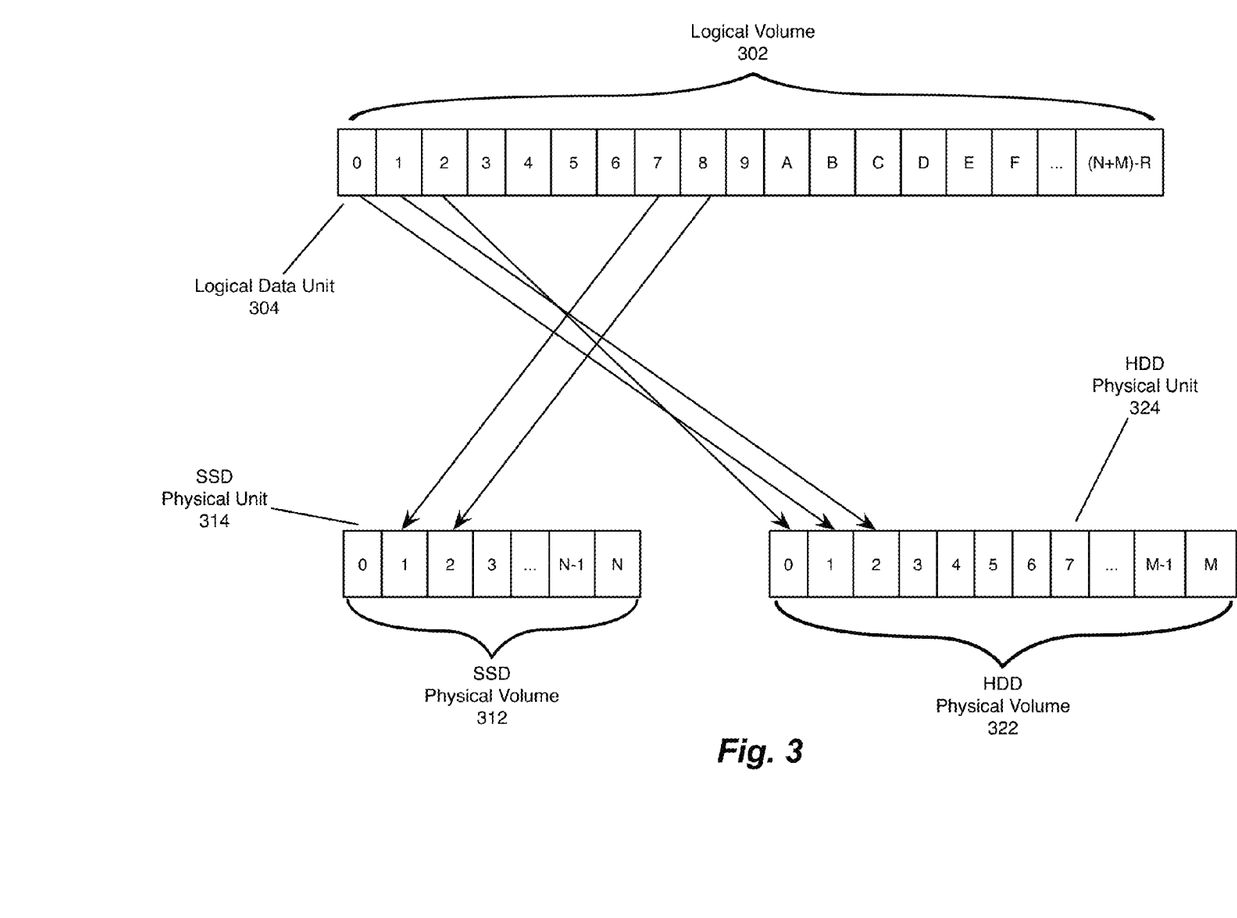
FIG. 3 shows a block diagram of an example logical volume according to one embodiment of the invention.

FIG. 3 shows a block diagram of an example logical volume according to one embodiment of the invention. A logical volume 302 allows one or more physical storage volumes to appear as a single logical device to an operating system. In one embodiment, the logical volume 302 can contain multiple data units 304, which can map to a physical unit on a storage device. In one embodiment, a logical volume can be used to interface with a composite disk, such as the composite disk illustrated in FIG. 2. In such embodiment, a fast non-volatile storage device (e.g. SSD physical volume 312) is coupled with a slower, larger capacity non-volatile storage device (e.g. HDD physical volume 322). In such example, the multiple logical data units 304 of the logical volume can map to an SSD physical unit 314 or an HDD physical unit 324.

In one embodiment, a logical data unit 304 on the logical volume can map freely between physical units on the one or more physical volumes, presenting a contiguous address space between non-contiguous physical units on the one or more physical volumes. In a composite storage device utilizing a fast storage component, migrating physical units from the slower storage component to the faster storage component can realize improved system performance when those physical units are accessed frequently. To improve input-output (I/O) performance when migrating data units between physical volumes of the composite disk, data blocks are migrated as a migration unit when data is transferred between physical volumes. Grouping data blocks can reduce the size of the data structures used to manage the data blocks, which can reduce memory consumption and reduce the overall overhead imposed on the system when managing a composite data storage system.

In on embodiment, multiple blocks of data can be stored in a migration unit to reduce I/O overhead during data migration. In one embodiment, a migration unit can contain a single block of data. In one embodiment, multiple data block sizes and data block groupings can be used to tune system performance and efficiency. In one embodiment, as migration unit size increases, an increase in the efficiency of the I/O operations can be realized between the physical volumes. However, with larger sized migration units, some degree of data granularity is lost, and the composite store device migration management system may not be able to target the most accessed data blocks without migrating a larger number of spatially local, but rarely referenced data blocks. Multiple data block and migration unit sizes and configurations are possible.

In one embodiment, space to store logical block metadata to manage a logical volume, such as the logical volume 302 of FIG. 3, is sparsely allocated to preserve memory. In other words, descriptive data and physical addresses for the mapped block is not allocated in the logical volume for empty blocks on the physical volume. Additionally, files that are deleted from a slower physical volume will leave data block holes in the migration unit. In one embodiment, newly created files that can fit in a logical volume data hole can be created on the faster physical volume and mapped into a data hole on the logical volume, which can substantially decrease the file creation time.

Figure 4:
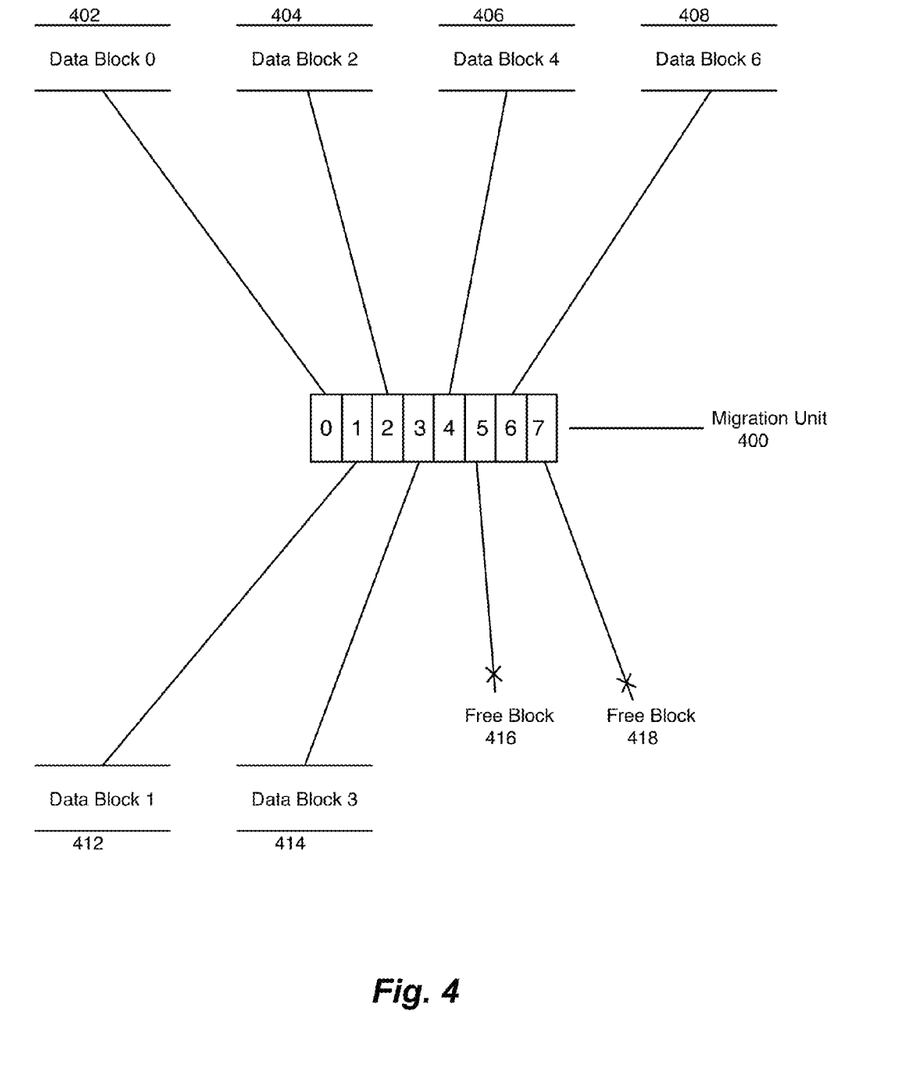
FIG. 4 presents a block diagram illustrating an example of a migration unit that contains multiple filled and empty data blocks.

FIG. 4 presents a block diagram illustrating an example of a migration unit that contains multiple filled and free data blocks. A migration unit is the minimum unit in the mapping from logical volume to physical volume. A migration unit can be unmapped from the logical volume, making this part of the logical volume sparse, only when all data blocks in this migration unit are freed by the file system on top of the logical volume. In one embodiment, if any block in the migration unit is allocated, the whole migration unit is mapped from the logical volume to the physical volume, though other embodiments are not limited in such a manner. For example purposes, six data blocks (e.g. data block 402 through data block 414) of four kilobytes each are illustrated. The example blocks are stored in a thirty-two kilobyte migration unit (e.g. migration unit 400), leaving space for two unfilled data blocks, free block 416, and free block 418.

In one embodiment, space in the logical volume to manage the empty migration units is not allocated. When a write is sent to the logical volume, if it is sent to one or more unmapped migration units, metadata for those migration units will need to be allocated, and part or all data blocks in these new filled migration units will be filled with data. When performing I/O operations on a file system or storage device, some method of ensuring atomic access to the storage volume is generally desirable to maintain data integrity when multiple processes or threads are performing concurrent device accesses. Concurrent access on a storage device is a relatively simple case when the access ranges do not overlap. However, non-overlapping sequential writes that are not aligned to the migration unit boundary often need to compete allocating overlapping migration units. In these very common sequential write workloads, advanced methods and techniques of managing atomic access can result in system performance improvements.

Figure 5:
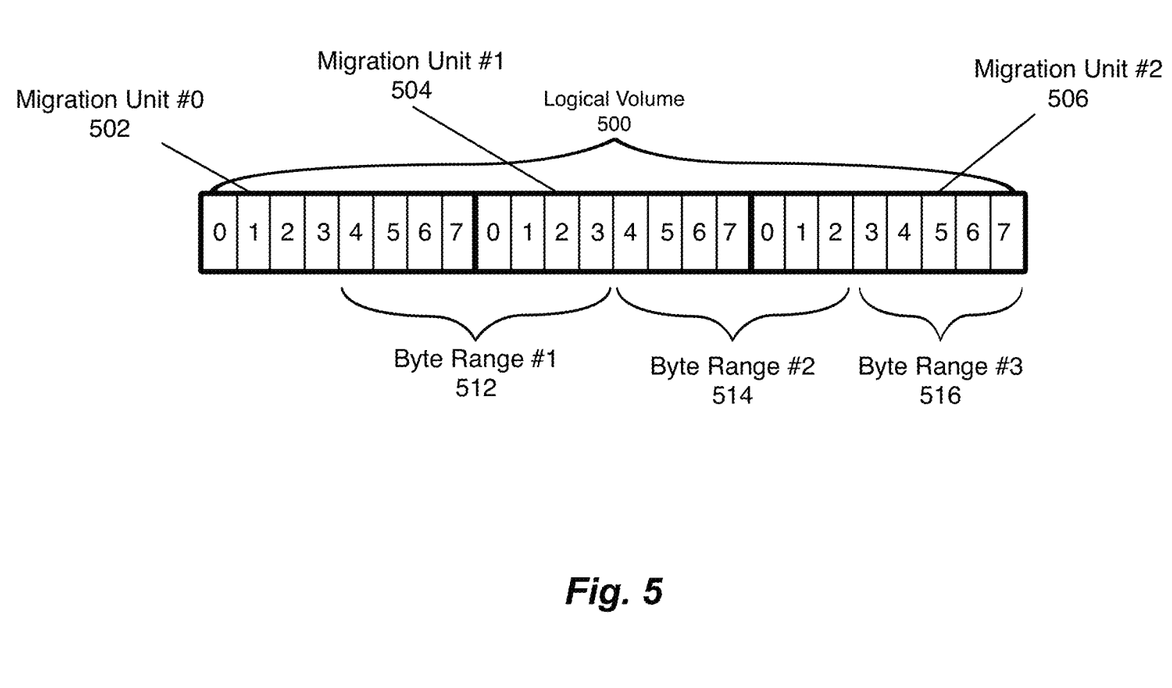
FIG. 5 shows a block diagram of a logical volume with multiple pending write across multiple migration units.

For example, FIG. 5 shows a block diagram of a logical volume with multiple pending writes across multiple migration units. In one embodiment, a sparse logical volume allocation method can increase the complexity of such scenarios because of the additional I/O operations required to fill the data holes. In other words, to fill the empty or unused portion in a range of locations or addresses. In this example, a portion of the logical volume 500 is illustrated, which spans migration unit zero 502, migration unit one 504 and migration unit two 506. Three operations are pending across three byte ranges, an operation on byte range one 512, from block 4 of migration unit zero 502 to block 3 of migration unit one 504; an operation on byte range two 514, from block 4 of migration unit one 504 to block 2 of migration unit two 506; and an operation on byte range three 516, from block 3 of migration unit two 506 to block 7 of migration unit two 506. In such a scenario, multiple byte range locks of the original I/O do not conflict. In one embodiment, if the three migration units are holes in the logical volume, the action of allocating these migration units on the physical volume will try to allocate overlapping ranges of blocks. In such embodiment, the allocations must be handled correctly to guarantee both correctness and good performance of sequential write. In one embodiment, to fill a migration unit hole, the entire migration unit holding the hole is locked, any required metadata in the logical volume is updated, and then the hole is mapped to a migration unit on a physical volume. For example, without hole filling, the three byte ranges, byte range 512, byte range 514, and byte range 516 are not overlapping, and the three writes corresponding to these three byte ranges can be sent to the underlying storage device immediately, and efficient I/O pipelining can happen to serve all these three writes; however, when the three migration units, migration unit 502, migration unit 504, and migration unit 506, are sparse and hole fillings are needed, byte range one 512 is expanded to cover migration unit zero 502 and migration unit one 504; byte range two 514 is expanded to cover migration unit one 504 and migration unit two 506; and byte range three 516 is expanded to cover migration unit two 506. These byte ranges, after expansion for hole filling, are now overlapping. Locking the entire range of a migration unit can have a substantial serializing effect to I/O operations conducted on the storage volume because the lock-range of operations now overlaps. Any I/O operation waiting to lock a particular byte range can be locked out of an entire migration unit while the data hole is filled. Accordingly, a method of minimizing the duration of migration unit locks during data hole filling operations can result in an improvement in logical volume performance under certain scenarios.

Figure 6:
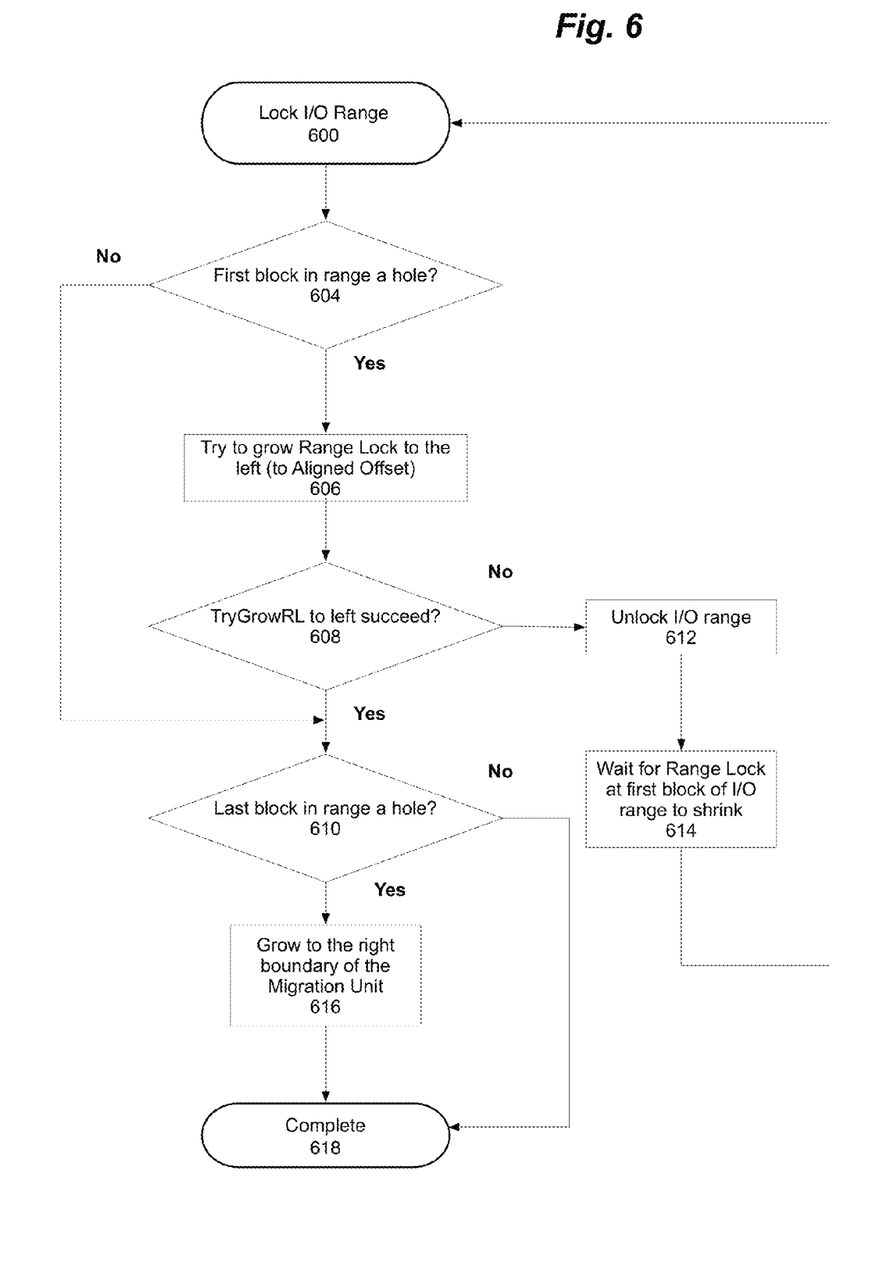
FIG. 6 is a flow diagram of one embodiment of a method of byte range locking which can improve the performance of a logical volume during concurrent access scenarios involving data hole filling.

FIG. 6 is a flow diagram of one embodiment of a method of byte range locking which can improve the performance of a logical volume during concurrent access scenarios involving data hole filling. In one embodiment, a lock I/O range command 600 is issued by a logical volume manager, which can request a range lock for a given byte offset and length which corresponds to the byte offset and length as the write request to be served. In one embodiment, once a lock on the input-output (I/O) range is acquired, the logical volume manager, or equivalent management logic, can check in operation 604 to determine if the first block in a lock range is a data hole that will be filled. If there is no data hole at the first block of the lock range, the manager can proceed to operation 610, which determines if the last block of the byte range contains a data hole. If the last block does not contain a data hole, then the manager may proceed to FIG. 7.

In one embodiment, if, during operation 604 it is determined that the first block in the locked byte range has a hole, then the manager can attempt an operation 606 which tries to grow the range lock to the "left" (e.g. towards a lower address) to encompass the aligned offset. The aligned offset is the left offset of the migration unit, and the range lock is expanded to encompass the aligned offset because, in one embodiment, the entire migration unit is locked to fill the data hole. If the grow-left operation is unsuccessful, it can indicate that another operation currently has the lock on the byte range, which includes the address space to the left (e.g. the lower address space) that includes the beginning of the migration unit. In one embodiment, I/O operations are resolved in the order of lower address space to higher address space, which means the range lock to the left of the current range lock has priority. Accordingly, the attempt to grow the lock range to the left fails. If operation 608 notices a grow-left operation failure, operation 612 is performed which unlocks the originally requested I/O range and proceeds to operation 614, which can wait until the range lock to the left shrinks or resolves, at which time the manager may return to operation 600, which will again attempt to lock the original I/O range. It is to be noted that, at this point, the data hole may ultimately be filled during another I/O operation, which means that during the second pass after failing to grow to the left, the data hole may have been filled.

In the event operation 608 indicates that the grow-left operation was successful, the manager can perform operation 610 to determine if the last block in the lock range is a data hole. In one embodiment, if the last block in the range is a data hole, then the entire migration unit containing the hole can be locked, and the manager can attempt to grow the range lock to the right, such as into a higher address on the storage volume, to encompass the right boundary of the migration unit. In this case, the grow-right operation has priority over lock ranges on higher address spaces, so the operation will not return until a lock has been acquired. In the event operation 610 determines that the last block in the range is not a data hole, no grow-right operation is performed, and the range lock operation completes in operation 618.

Figure 7:
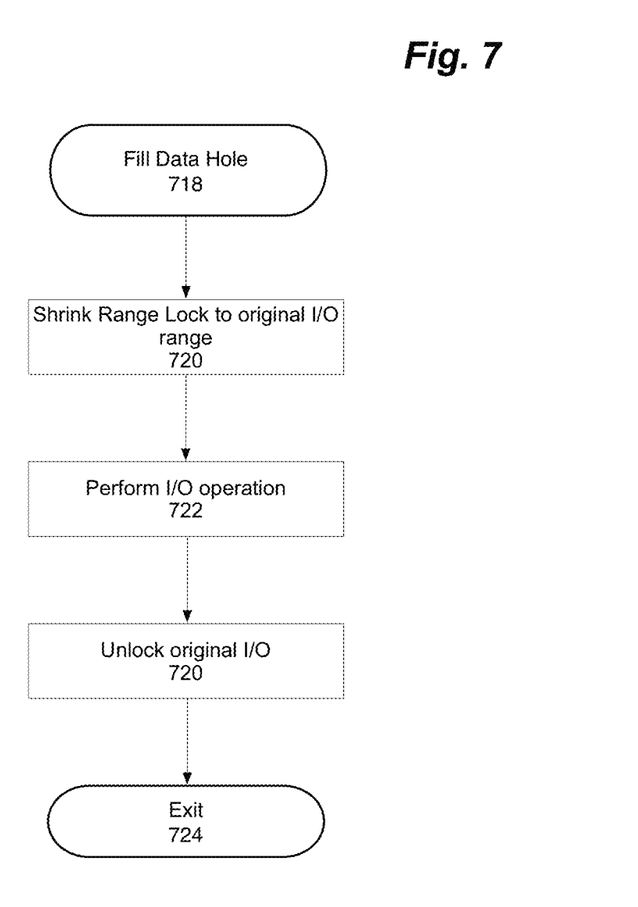
FIG. 7 is a flow diagram of one embodiment of a method to fill the data hole once the lock range operation completes.

FIG. 7 is a flow diagram of one embodiment of a method to fill the data hole once the lock range operation completes. In one embodiment, the appropriate range is locked at the completion of the range lock operation illustrated in FIG. 6, so the data hole can immediately be filled in operation 718. Once the data hole is filled, the manager can perform an operation 720 which will shrink the range lock to the originally requested I/O range. This shrink operation allows competing lock operations that are waiting for the previously locked ranges to complete earlier than they would have if the entire lock range used for the data hole filling were maintained until the original I/O operation were complete. Operation 722 to perform the originally requested I/O operation can proceed, before the original I/O range is unlocked in operation 720, before exiting in operation 724.

Figure 8:
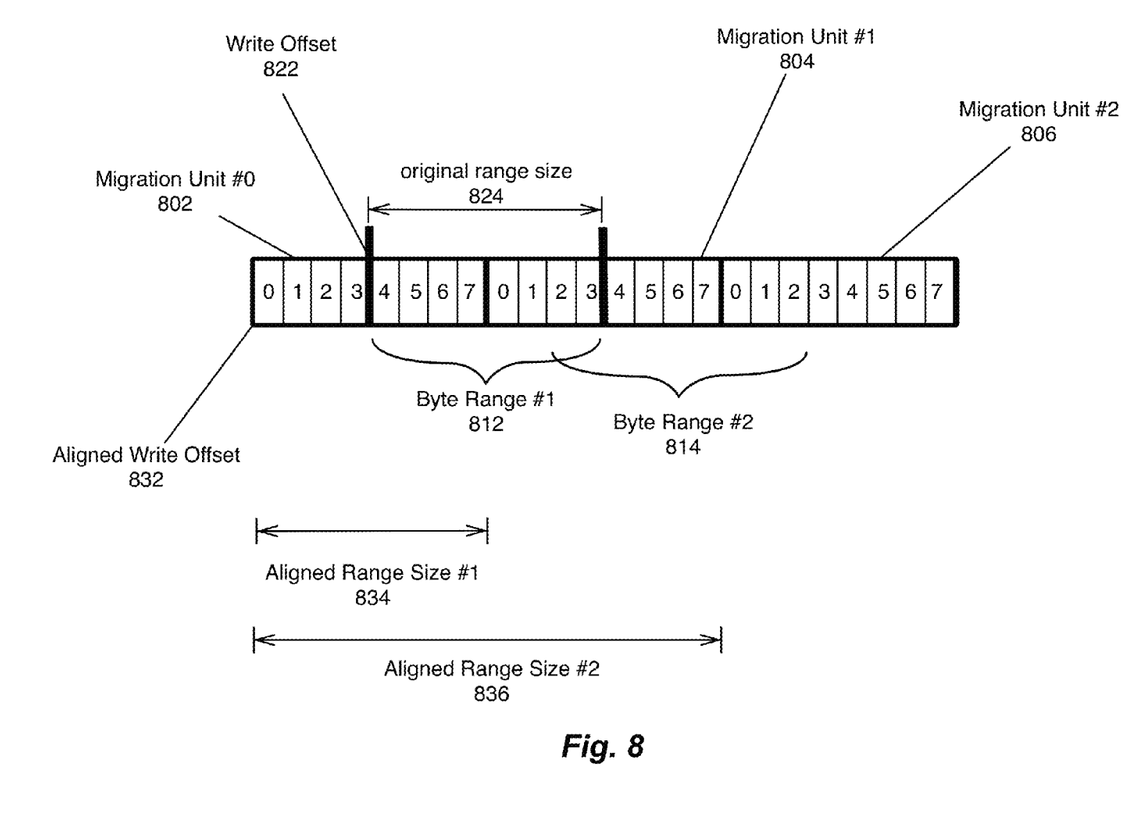
FIG. 8 is a block diagram illustrating a resolution of overlapping byte ranges according to one embodiment of the invention.

FIG. 8 is a block diagram illustrating a resolution of overlapping byte ranges according to one embodiment of the invention. In one embodiment, an I/O operation on a first byte range 812 may overlap with operations on a second byte range 814. The first byte range 812 includes migration unit zero 802 and migration unit one 804, while the second byte range 814 includes migration unit one 804 and migration unit two 806. In one embodiment, operations are resolved in a "left to right" manner, meaning the lower address ranges are resolved first. If, for example, migration unit zero 802, at byte range write offset 822 is a data hole, in one embodiment, the original range size 824 of byte range one 812 can grow to the aligned write offset 832. If migration unit one 804 is not a data hole, the new range lock size covers an aligned range size 834 which is a union of migration unit zero 802 and the original range size 824. In this case the data hole at migration unit zero 802 can be filled and the lock can shrink to the original range size 824.

Alternatively, if migration unit one 804 is a data hole, a grow-right operation can expand the lock to the edge of migration unit one 804 to cover an aligned range size 836, which includes all of migration unit zero 802 and migration unit one 804. In one embodiment, once the data hole is filled, the range lock can shrink to the original range size 824 and perform the originally requested I/O operation. In one embodiment, if migration unit one 804 is a hole, it may have been filled by the I/O operation across byte range one 812. In any case, an operation on byte range two 814 will have to wait until any locks held by the operation on byte range one 812 complete before it can acquire a lock across byte range two 814.

Figure 9A:
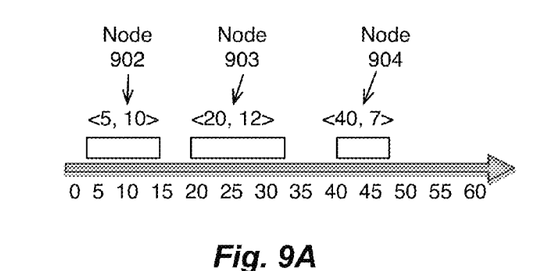
FIG. 9A-9C are block diagrams illustrating one set of locked nodes in an ordered tree data structure according to one embodiment of the invention.

FIG. 9A is a block diagram illustrating one set of locked nodes according to one embodiment of the invention. Enforcing atomic access to a byte range on a storage device generally means that lock ranges cannot overlap. Accordingly, if a lock on a byte range is acquired by one operation, a second operation may be prevented from attain a lock on a portion of storage that includes blocks in the locked range. In one embodiment, locked ranges are managed as nodes in an ordered tree data structure. Node 902 represents a lock on a byte range beginning at offset five and extending a length of ten to offset fifteen. Node 903 represents a byte range starting at offset twenty and extending a length of twelve to offset thirty-two. Node 904 represents a lock on a byte range beginning at offset forty and extending to offset forty-seven. It is to be noted that any search tree algorithm, such as red-black tree, AVL tree, splay tree, etc. can be used for the ordered tree data structure, and embodiments are not limited to a particular type of ordered tree.

Figure 9B:
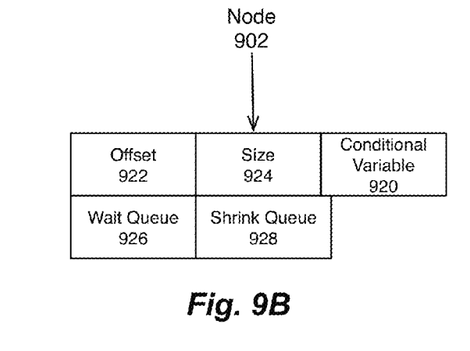

FIG. 9B is a block diagram of an example node 902. In one embodiment, the example node 902 can comprise a data structure containing the range lock offset 922, the size of the range lock 924. The node 902 can also contain pointer information, which can reference a wait queue 926 and a shrink queue 928, and a conditional variable 920.

Figure 9C:
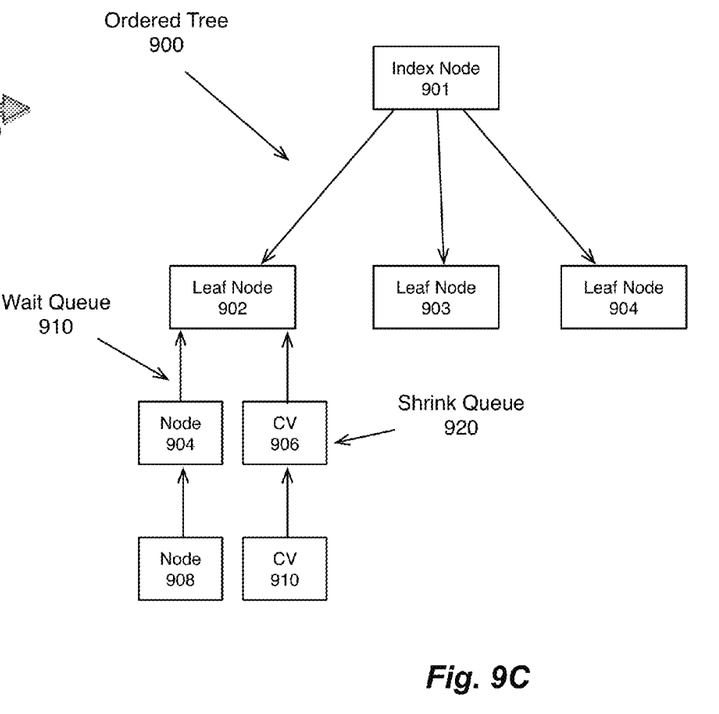

FIG. 9C is a block diagram of one embodiment of an ordered tree data structure which can sort both lock ranges and manage nodes waiting on lock ranges. In one embodiment, the ordered tree 900 can contain an index node 901, which contains pointers to node 902, node 903, and node 904, which are leaf nodes in the tree structure. In one embodiment, lock ranges are not allowed to overlap, so pending locks with overlapping ranges can form a queue on a node and wait for the lock range to be unlocked, at which point the waiting node can be inserted into the tree and the range lock can be granted. In one embodiment, waiting node 904 and 908 are in the wait queue 910 of node 902. These nodes can be inserted into the tree when a lock on the range the node represents may be granted to the corresponding thread or process, which wishes atomic access to the byte range. A shrink queue 920 contains a queue of conditional variables 920, such as conditional variable 906 and conditional variable 910, which can be used to wake a sleeping operation, which is waiting for a byte range lock to shrink or unlock.

Figure 10:
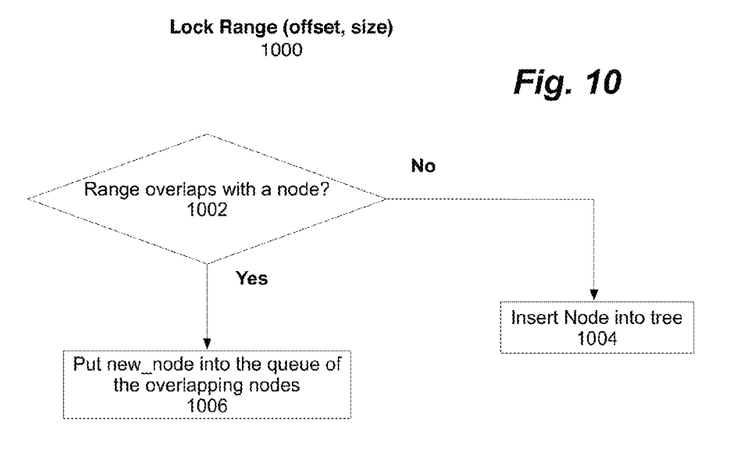
FIG. 10 is a flow diagram illustrating one embodiment of a method which can be used to add a new lock to a lock range tree structure.

FIG. 10 is a flow diagram illustrating one embodiment of a method which can be used to add a new lock to a lock range tree structure such as 900 of FIG. 9C. In one embodiment, a lock range method 1000 can be implemented as a logic block accepting a byte offset and a size as input data. The logic can perform an operation 1002, which can detect if a range overlaps with a node presently in the tree structure, which indicates the byte range is currently locked. If the range does not overlap with a range currently in the tree, a node representing a byte range lock at the input offset and extending for the input size can be inserted into a tree 1004. Otherwise, in operation 1006, a new node is added to the queue of a node that it overlaps. It is to be noted that a given waiting node can be added to the wait queue of only one node in the tree, although it may overlap with multiple locked ranges.

Figure 11:
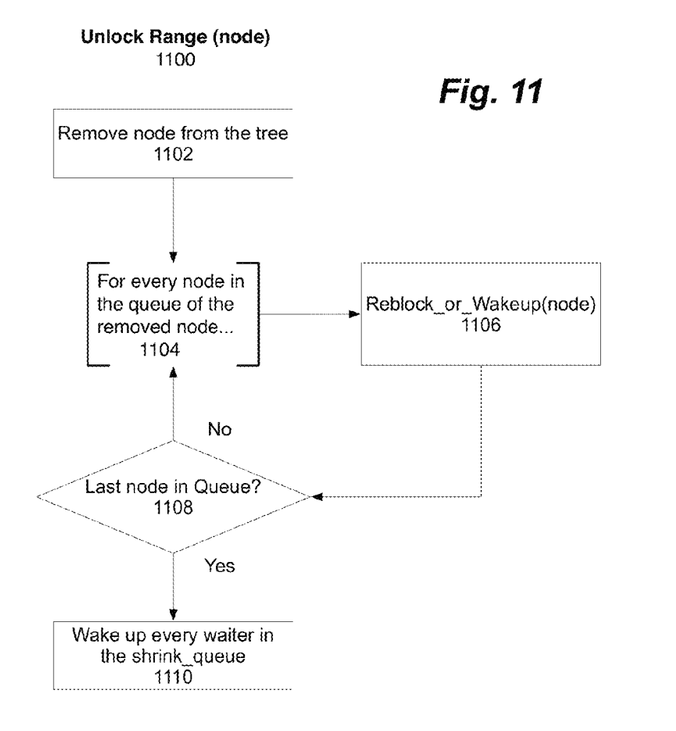
FIG. 11 is a flow diagram illustrating one embodiment of a method which can be used to remove a lock from a lock range tree structure.

FIG. 11 is a flow diagram illustrating one embodiment of a method which can be used to remove a lock from a lock range tree structure such as the ordered tree 900 of FIG. 9C. In one embodiment, unlock range logic 1100 can unlock a byte range by removing the node representing the lock from the tree, in an operation such as operation 1102. If the locked range contained waiting nodes, then operation 1104 can, for each node in the queue of the removed node, operation 1106 will utilize reblock_or_wakeup logic upon every node in the queue, until, in operation 1108, the last node in the queue is processed. Operation 1110 can then wake every waiting condition in the shrink queue.

Figure 12:
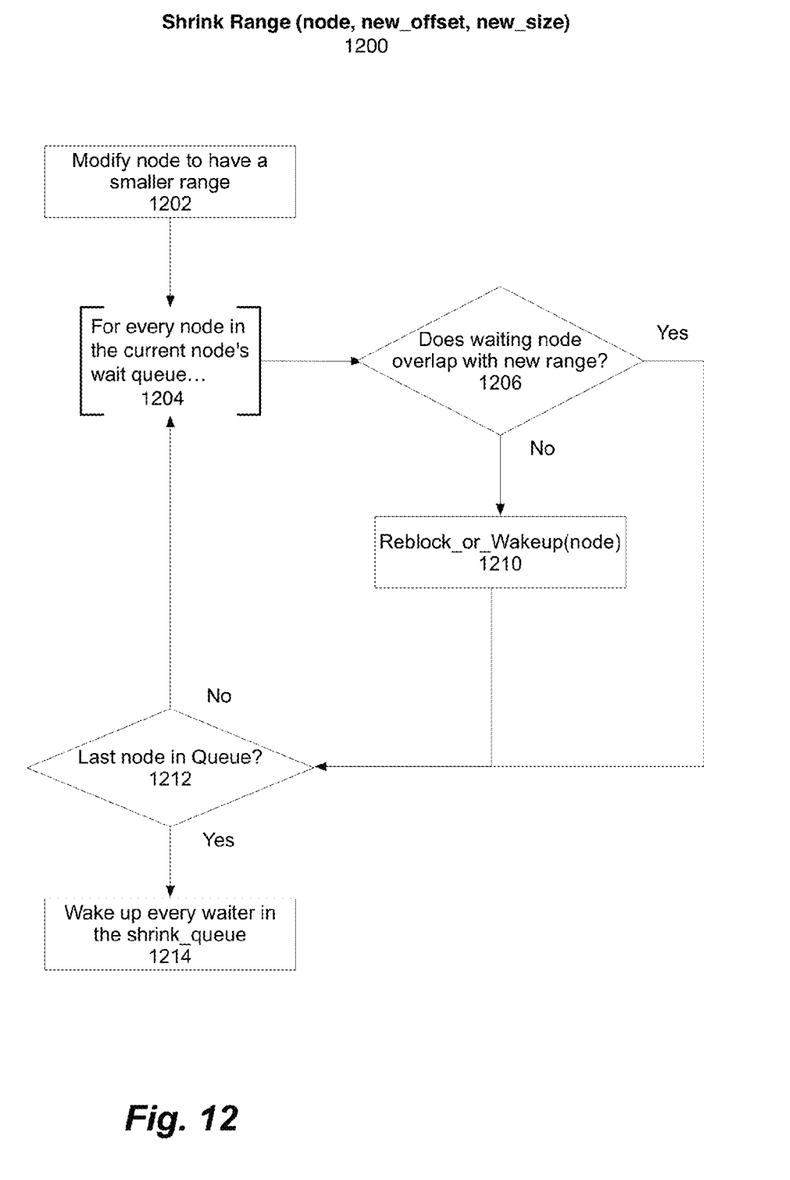
FIG. 12 is a flow diagram illustrating one embodiment of a method which can be used to shrink the range of a currently acquired byte range lock.

FIG. 12 is a flow diagram illustrating one embodiment of a method, which can be used to shrink the range of a currently acquired byte range lock. In one embodiment, shrink range 1200 logic accepts a new offset and size for a currently held lock and then reduces the lock range. In one embodiment, in operation 1202, the node representing the lock range is modified to have a smaller range, which, in some circumstances, can enable new locks to be granted. Accordingly, in operation 1204, for every node in the current node's wait queue, the byte range is sent to a logic block 1206 to determine if the waiting node overlaps with the new, smaller range set in operation 1202, until the determination, in operation 1212, is made that the last node in the queue has been processed. For each waiting node which does not overlap with a new range, logic block 1206 can perform an operation 1210 which utilizes reblock_or_wakeup logic on each non-overlapping node to determine if the node is re-blocked by an additional byte range lock, or if it may awaken to accept a lock, resulting in a node insertion into the range-lock tree structure. In one embodiment, once each node in the wait queue is processed, an operation 1214 is performed which can wake up each waiter in the shrink queue to evaluate the waiter's conditional variable.

Figure 13:
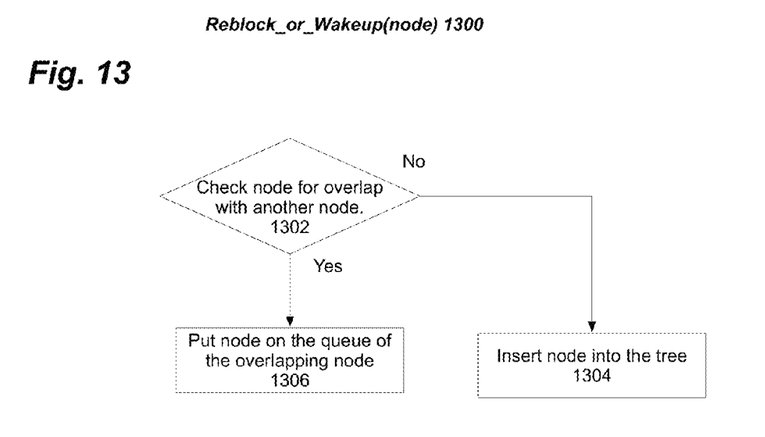
FIG. 13 is a flow diagram illustrating one embodiment of re-blocking or waking a waiting range-lock.

FIG. 13 is a flow diagram illustrating one embodiment of a method on a waiting node. A reblock_or_wakeup method 1300 can, in operation 1302, check the waiting node byte range to determine if the range overlaps with another node in the range-lock tree, which represents a currently held lock, which can prevent the waiting lock from resolving. If the range is still blocked, the node representing the waiting lock can be placed into the wait queue of the overlapping node in operation 1306. If the range is not blocked, operation 1304 can place the node into the tree.

Figure 14:
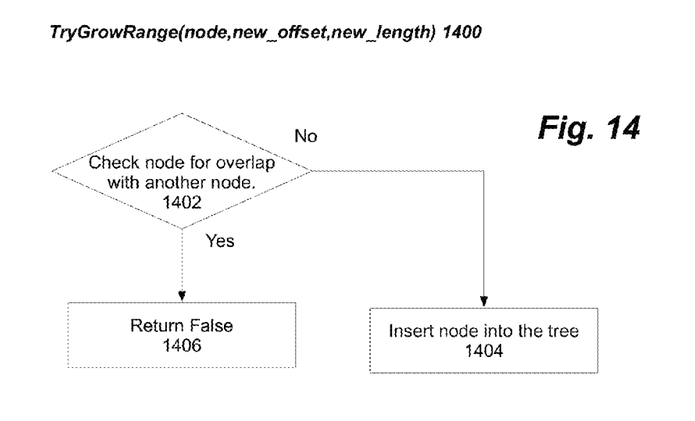
FIG. 14 is a flow diagram illustrating one embodiment of a method which can attempt to grow a currently held lock to a new range.

FIG. 14 is a flow diagram illustrating one embodiment of a TryGrowRange method 1400, which can attempt to grow a currently held lock to a new range. In one embodiment, the new range desired is examined in an operation 1402, which, if there is no overlap, can trigger an operation 1404 which can insert the node into the tree and grant the larger byte range lock. Otherwise, operation 1402 will indicate that operation 1406 can be performed, which can return false, which will indicate the TryGrowRange 1400 operation has failed.

Figure 15:
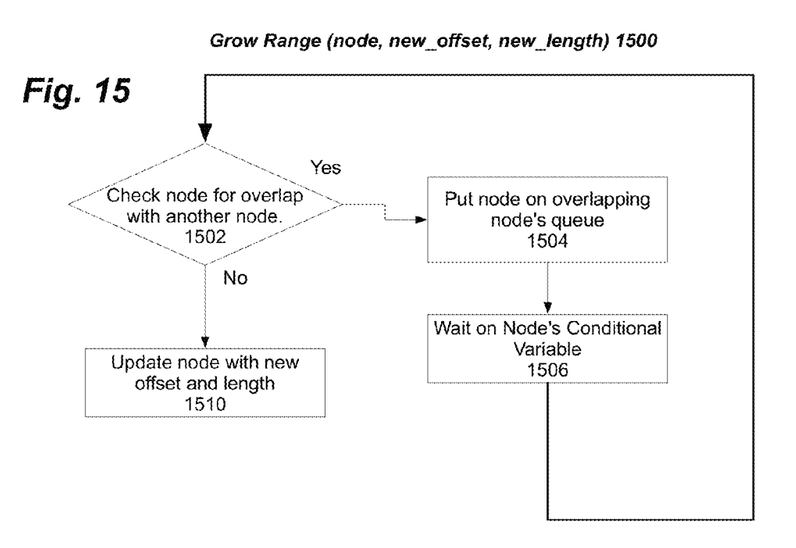
FIG. 15 is a flow diagram illustrating one embodiment of a method which can grow the lock range of an input node to a new offset and a new range in an unyielding manner.

FIG. 15 is a flow diagram illustrating one embodiment of a Grow Range method 1500, which can grow the lock range of an input node to a new offset and a new range in an unyielding manner. In one embodiment, operation 1502 can check the lock range of the input node to determine if there is overlap with a currently locked range. If such overlap exists, the node is placed on the overlapping node's queue in operation 1504, where the method will wait on the node's conditional variable in operation 1506, which will wait until a lock range shrink or clear allows the node's lock range to grow. Ultimately, the blocking lock operations will shrink or clear, and in operation 1510 the node can update with a new offset and length.

Figure 16:
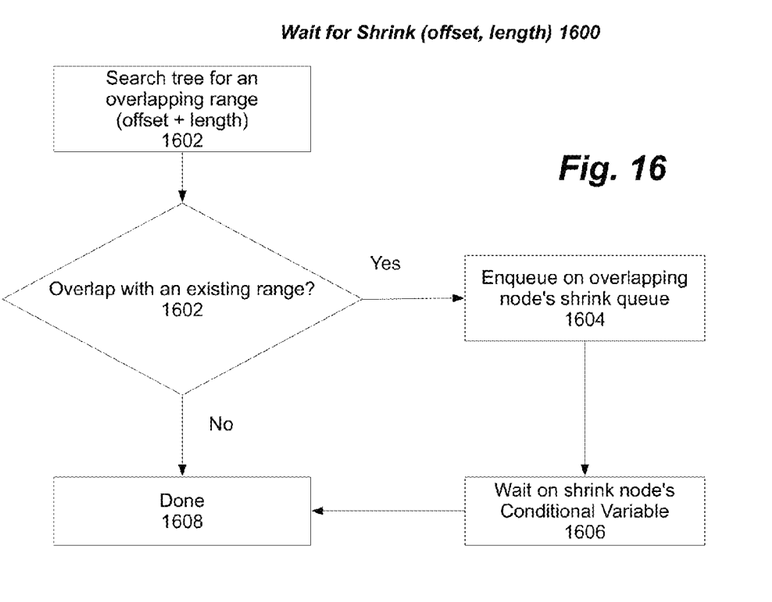
FIG. 16 is a flow diagram illustrating one embodiment of method, which can wait on a range-lock shrink condition.

FIG. 16 is a flow diagram illustrating one embodiment of a Wait for Shrink 1600 method. In one embodiment, operation 1602 can search the lock tree for a range, which overlaps the desired range represented by input offset and length data. Operation 1602 can determine whether there is overlap with any existing range and, if so, enqueue on the overlapping node's shrink queue in operation 1604 and then, in operation 1606, wait on the shrink node's conditional variable until the conditional variable is satisfied, and then completes in operation 1608.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A non-transitory computer-readable medium with instructions stored therein, the instructions, when executed by a processor, cause the processor to perform operations, the operations comprising:
    locking a first range of addresses corresponding to at least one data block of a logical volume on a composite data storage system;
    growing the range of locked addresses to a second range of addresses without an intermediate unlock, the second range of addresses encompassing a migration unit including the at least one data block;
    filling a data hole in the logical volume by allocating metadata associated with the logical volume for the data hole and mapping the data hole to a migration unit on a physical volume of the composite data storage system; and
    shrinking the range of locked addresses to the first range.

2. The computer-readable medium of claim 1, further comprising performing an input-output operation corresponding to the first range of addresses, and unlocking the first range of addresses.

3. The computer-readable medium of claim 1, wherein locking the first range of addresses comprises detecting a byte-range overlap between the first range of addresses and a range of locked addresses associated with a locked node, wherein the locked node is in an ordered tree data structure.

4. The computer-readable medium of claim 3, wherein locking the first range of addresses further comprises inserting a first node representing a first byte-range into the ordered tree data structure when no byte-range overlap is detected.

5. The computer-readable medium of claim 4, wherein locking the first range of addresses further comprises inserting the first node into a queue associated with the locked node in the ordered tree data structure, wherein the byte-range associated with the first node and the locked node overlap.

6. The computer-readable medium of claim 1, wherein growing the range of locked addresses to the second range comprises detecting a byte-range overlap between the second range of addresses, and a locked range of addresses associated with a locked node, wherein the locked node is in an ordered tree data structure.

7. The computer-readable medium of claim 6, wherein growing the range of the locked addresses to the second range further comprises inserting a second node into the ordered tree data structure, the second node corresponding to the second range of addresses, wherein no byte-range overlap is detected.

8. The computer-readable medium of claim 6, wherein growing the range of the locked addresses further comprises inserting a second node into a queue associated with the locked node in the ordered tree data structure, wherein a byte-range overlap is detected with the second range of addresses.

9. The computer-readable medium of claim 6, wherein shrinking the range of locked addresses to the first range comprises:
    modifying the byte-range associated with a locked node from the second range to the first range;
    determining if a node in a queue of the locked node the overlaps with the second range; and
    determining if the node in the queue of the locked node is blocked by a third byte-range lock associated with a third node in the ordered tree data structure.

10. A composite data storage system comprising:
    a first data storage device, to store a set of migration units comprising multiple physical data storage units;
    a second data storage device, attached to the first data storage device, to store a set of migration units comprising multiple physical data storage units;
    a storage controller for the first and second data storage device, to store logical data units, the logical data units mapped to a physical data storage unit of the first device or the second device;
    a data migration processor to selectively migrate frequently referenced migration units on the second data storage device to the first data storage device; and
    a logical volume manager, to manage the first and second data storage device as a logical volume, wherein a data hole in the logical volume corresponding to data removed from the second data storage device is mapped to data stored in the first data storage device by allocating metadata associated with the logical volume for the data hole and mapping the data hole to a migration unit on the first data storage device.

11. The data storage system of claim 10, wherein the logical volume manager is configured as a sparsely allocated logical volume to preserve memory.

12. The data storage system of claim 11, wherein the logical volume manager is configured to shrink a byte-range lock on the logical volume without an intermediate unlock operation.

13. The data storage system of claim 12, wherein data removed from the logical volume creates a data hole in one or more migration units of a data storage device.

14. The data storage system of claim 13, wherein the first data storage device has a higher performance relative to the second data storage device.

15. The data storage system of claim 10, wherein the logical volume is configured to perform operations to wait for a lock range shrink, the operations to:
  search an ordered tree for a locked byte-range which with an offset and length that overlaps a desired lock range; and
  add a node corresponding to the desired lock range to a queue corresponding to a node on an ordered tree, the node representing a locked byte-range.

16. A computer-implemented method comprising:
  locking a first range of addresses corresponding to at least one data block of a logical volume on a composite data storage system;
  growing the range of locked addresses to a second range of addresses without an intermediate unlock, the second range of addresses encompassing at least one migration unit including the least one data block;
  filling a data hole in the logical volume by allocating metadata associated with the logical volume for the data hole and mapping the data hole to a migration unit on a physical volume of the composite data storage system; and
  shrinking the range of locked addresses to the first range.

17. The computer-implemented method of claim 16, further comprising performing an input-output operation corresponding to the first range of addresses and unlocking the first range of addresses.

18. The computer-implemented method of claim 17, wherein locking the first range of addresses comprises detecting a byte-range overlap between the first range of addresses, and a range of locked addresses associated with a locked node, wherein the locked node is in an ordered tree data structure.

19. The computer-implemented method of claim 18, wherein locking the first range of addresses further comprises:
  inserting a first node into a queue associated with the locked node in the ordered tree data structure, wherein the byte-range associated with the first node and the locked node overlap, and wherein the first node represents the first range of addresses; and
  inserting the first node into the ordered tree data structure when no byte-range overlap is detected.

20. The computer-implemented method of claim 19, wherein growing the range of locked addresses to a second range comprises detecting a byte-range overlap between the second range of addresses, and a locked range of addresses associated with a locked node, wherein the locked node is in an ordered tree data structure.

21. The computer-implemented method of claim 20, wherein growing the range of the locked addresses to a second range further comprises inserting a node into the ordered tree data structure, the node corresponding to the second range of addresses, wherein no byte-range overlap is detected.

22. The computer-implemented method of claim 20, wherein growing the range of the locked addresses further comprises inserting a node into a queue associated with the locked node in the ordered tree data structure, wherein a byte-range overlap is detected with the second range of addresses.

23. The computer-implemented method of claim 20, wherein shrinking the range of locked addresses to the first range of locked addresses comprises:
  modifying the byte-range associated with a locked node from the second range of locked addresses to the first range of locked addresses;
  determining if a node in a queue of the locked node the overlaps with the second range; and
  determining if the node in the queue of the locked node is blocked by a third byte-range lock associated with a third node in the ordered tree data structure.

* * * * *